United States Patent
Look et al.

(10) Patent No.: US 8,954,836 B1
(45) Date of Patent: Feb. 10, 2015

(54) SYSTEMS AND METHODS FOR DIRECTING ACCESS TO PRODUCTS AND SERVICES

(71) Applicant: Adlast, Inc., San Francisco, CA (US)

(72) Inventors: Andrew Look, San Francisco, CA (US); Greg Bowyer, San Francisco, CA (US); Andrew Goldstein, San Francisco, CA (US); Joe Isaacson, San Francisco, CA (US); David Lee, San Francisco, CA (US); Jeremy Lucas, San Francisco, CA (US); John Milinovich, San Francisco, CA (US); Manan Patel, San Mateo, CA (US); Chris Sell, San Francisco, CA (US); Parth Shah, Mountain View, CA (US); Nathanael Smith, San Francisco, CA (US); Sujeeth, San Francisco, CA (US); James Turner, Oakland, CA (US); Neal Wiggins, San Francisco, CA (US)

(73) Assignee: Adlast, Inc., San Francisco, CA (US)

( * ) Notice: Subject to any disclaimer, the term of this patent is extended or adjusted under 35 U.S.C. 154(b) by 0 days.

(21) Appl. No.: 14/463,257

(22) Filed: Aug. 19, 2014

(51) Int. Cl.
*G06F 17/00* (2006.01)
*G06F 17/22* (2006.01)
*G06F 17/30* (2006.01)

(52) U.S. Cl.
CPC ...... *G06F 17/2235* (2013.01); *G06F 17/30887* (2013.01)
USPC .......................................... 715/206; 715/205

(58) Field of Classification Search
CPC .......... G06F 17/30884; G06F 17/2235; G06F 17/30887; G06F 8/61; G06F 8/60
USPC .......................... 715/205, 206; 717/174, 178
See application file for complete search history.

(56) References Cited

U.S. PATENT DOCUMENTS

2006/0059062 A1* 3/2006 Wood et al. ...................... 705/35
2014/0208205 A1* 7/2014 Bartholomew ............... 715/716

OTHER PUBLICATIONS

"Upgrading to RequireJS 2.0" Aug. 11, 2012 https://github.com/jrburke/requirejs/wiki/Upgrading-to-RequireJS-2.0#pathsfallbacks.*
Clark, Josh. "5 Tips for Shopping Online" Dec. 5, 2008. HowStuffWorks.com. <http://money.howstuffworks.com/personal-finance/online-banking/online-shopping.htm> Dec. 30, 2014.*
"RSS", Flexget, Archived Mar. 9, 2013 by archive.org http://flexget.com/wiki/Plugins/rss.*
Robert B. Doorenbos, Oren Etzioni, and Daniel S. Weld. 1997. A scalable comparison-shopping agent for the World-Wide Web. In Proceedings of the first international conference on Autonomous agents (AGENTS '97). ACM, New York, NY, USA, 39-48.*
GNU Wget 1.13.4 Manual, Archived Aug. 17, 2014 by archive.org, http://www.gnu.org/software/wget/manual/wget.html.*

* cited by examiner

*Primary Examiner* — Adam M Queler
(74) *Attorney, Agent, or Firm* — Goodwin Procter LLP

(57) ABSTRACT

In a system for enabling a user to access a product or service, resources for accessing the product or service, such as apps on a user device, are explored in a specified order. A relatively lower priority resource is not explored until it is determined that all higher priority resources are unavailable. Within the content corresponding to an available resource, the user can be readily directed to the portion of the content that is associated with the particular product or service.

9 Claims, 6 Drawing Sheets

SYSTEMS AND METHODS FOR DIRECTING ACCESS TO PRODUCTS AND SERVICES

FIELD OF THE INVENTION

This specification relates generally to systems and techniques for presenting information, products, and/or services on a user device and, in particular, to systems and techniques for enabling the user to readily access the information, products, and/or services and to providing information, products, and/or services determined to be relevant to the user.

BACKGROUND

Typically users viewing information or an advertisement about a product or service on a web page select a link on the web page that is associated with the product or service, if interested in that product or service. In response, a web browser opens a webpage identified by the link, such as the web page of an on-line store which sells the product or service. This "static" association, where a product or service link is associated with a particular on-line web store, can have drawbacks. For example, some user prefer online web stores while others prefer to use applications (or "apps") installed on their computing devices. The preference of the same person can also change based on the device that person is using at the time of clicking on the product link. Some links can automatically redirect to different locations depending on the type of the user's device. For example, clicking on a link on a laptop can direct the user to a regular webpage, while clicking on the same link while using a smartphone can direct the user to a mobile version of that webpage.

One problem with these techniques is that the link to which the consumer is directed is usually provided by a particular provider of a product or service. For example, if the consumer is interested buying a book, a multi-national online bookseller can provide a link to that book on that bookseller's web site but would likely not inform the user that the book is available at other locations as well. The publisher of the book, however, likely desires only that the book is sold—regardless of whether by the multi-national bookseller or by a local bookstore that does not have a strong online presence but the patrons of which use an app that informs them of new arrivals at the bookstore.

SUMMARY

In various implementations of methods and supporting systems described herein, a marketer or provider of a product or service can dynamically control links associated with the product or service so as to increase or maximize the likelihood that a consumer will buy the product or service. To this end, in one aspect a computer-implemented method includes determining a context based on, at least, a document presented on a user device. One or more links that each identifies a respective location of an inventory item in content of a respective software application are identified. A respective score for each of the links is calculated based on, at least, a relevance of the respective inventory item to the context and a probability that a user of the user device would engage with the respective application.

A resource is provided to the user device for presentation with the document. The resource is configured to initiate an attempt to open the respective location of a first link of the several links, in a user interface of the respective application of the first link. The first link can be determined or selected based on at least the respective scores of for each link. In some implementations, the resource is configured to initiate an attempt to open the respective location of a second link of the several links in a user interface of the respective application of the second link, if the attempt to open the respective location of the first link fails. The second link can also be determined or selected based on at least the respective scores of for each link.

An inventory of applications installed on the user device can be received, and the several links are selected such that the respective software application of each link is identified by the inventory. The context can be further based on a textual analysis of content of the document. The context can be further based on an identity of a software application that presented the document. Alternatively or in addition, the context can be further based on data received from an application, or a state of the application. In some implementations, the document and the resource are presented by the application of the first link, while in other implementations, the document is presented by a second application that is different than the application of the first link. The document can be a web page or a user interface of an application installed on the user device. The inventory item can be a physical product, a service, an organization, an establishment, or digital content.

In some implementations, calculating the respective scores includes determining a similarity between the context and one or more attributes of the respective inventory item. A particular attribute can be one of a brand, a model, a type of product or service, a type of establishment, and a technical specification of a product or service, or a description of the inventory item. Calculating the respective scores also includes determining the relevance of the respective inventory item to the context based on the similarity. Alternatively or in addition, calculating the respective scores can include determining a geographic location of the user device, and identifying a type of the user device. A probability that the user of the user device would engage with the respective application can be determined based on the geographic location of the user device and the type of the user device. The probability can be used in calculating the respective scores.

In some implementations, calculating the respective scores includes obtaining demographic information of a segment of a population, and determining the probability that the user of the user device would engage with the respective application based on a likelihood that an individual in the segment of the population would engage with the respective application. The demographic information can be obtained based on one or more of: a device identifier of the user device, a geographic location of the user device, or a type of user device.

In some implementations, calculating the respective scores includes identifying a user of the user device, and identifying a similarity of the inventory item to items the user has viewed, added to an electronic shopping cart, purchased, viewed, watched, or performed an action on in the respective application. A probability that the user of the user device would engage with the respective application is determined based on the similarity, and the respective scores can be based on the determined probability. Alternatively or in addition, calculating the respective scores can include identifying a user of the user device, determining a conversion rate for engagements of items similar to the inventory item by the user for the respective application, and determining the probability that the user of the user device would engage with the respective application based on the conversion rate.

In some implementations, calculating the respective scores includes identifying a user of the user device, and determining a conversion rate for engagements of items similar to the inventory item by the user for one or more applications that are similar to the respective application. A probability that the user of the user device would engage with the respective application is determined based on the conversion rate, and that probability can be used in calculating the respective scores. Additionally or in the alternative, calculating the respective scores can include determining a conversion rate for engagements of items similar to the inventory item for the respective application, and determining the probability that the user of the user device would engage with the respective application based on the conversion rate. The respective scores can also be calculated by identifying a bid amount for the respective inventory item and the respective application, and by calculating the score further based on the bid amount. In various implementations, the engagement can include either or both of a viewing and a purchase of an inventory item by a user. The resource can be a uniform resource locator, a markup language document, a selectable control, or an image.

In some implementations, prior to calculating a respective score for each of the links, the several links are filtered to select a subset thereof according to identities of respective entities associated with each of the links. For example, links from only a list of vendors on a specified list can be considered in subsequent processing. Determining the context can include analyzing a query, and the query can include text and/or an image associated with the content of the document. Providing the resource can include presenting a representation of the inventory item in the user interface of the respective application of the first link. The user interface can be configured to allow the user to add the inventory item to a purchase.

In another aspect, a computer-implemented method includes displaying on a user device a first resource that is associated with a first inventory item corresponding to a context of a document presented on the user device. The first resource also corresponds to a first collection of several links ordered according to a respective link score, such that each link in the first collection identifies the first inventory item. The method also includes receiving user selection of the first resource and, based thereon, attempting to resolve, in order, the respective application identified by each link of the first collection of links until a link that can be resolved is identified.

In some implementations, the method includes opening a location of the first inventory item. The location can be specified by the resolved link, and can be opened in a user interface of an application identified by the resolved link. Attempting to resolve the respective application identified by the link can include attempting to open the application identified by the link on the user device, and determining if the attempt to open the application succeeded or failed. In some implementations, attempting to resolve the respective application identified by the link includes determining that the application identified by the link is not installed on the user device and, based thereon, prompting the user to install the application or opening a web page that contains the inventory item. The method can also include displaying on the user device a second resource that is associated with a second inventory item corresponding to the context of a document presented on the user device. The second resource can correspond to one or more ordered links, each link identifying the second inventory item. A first inventory score can be associated with the first resource, and a second inventory score can be associated with the second resource, such that the first inventory score is greater than the second inventory score.

In another aspect, a computer-implemented method includes receiving a message that is associated with an ordered list of links, wherein each link identifies a respective location of an inventory item in content of a respective software application of several different software applications. The method also includes displaying the message on a user device, receiving a user response and, based thereon, attempting to resolve the respective application identified by each of the associated links according to the order until a first link that can be resolved is identified. The method further includes opening the location of the inventory item of the first link in a user interface of the application identified by the first link.

In some implementations, the ordered list of links corresponds to a single vendor. Attempting to resolve a respective application identified by the link can include attempting to open the application identified by the link on the user device, and determining if the attempt to open the application succeeded or failed. The inventory item is a product, a service, an organization, an establishment, or content. The message can presented by a first application that is the same as the application identified by the first link or, in the alternative, the message can be presented by a first application that is different than the application identified by the first link.

In another aspect, a computer-implemented method includes receiving at a user device, a message associated with an ordered list of links. Each link in the ordered list is configured to access an application associated with a particular vendor, where the application itself is configured to provide access to an inventory item associated with the message. The method also includes displaying the message on a user device and, in response to user selection of the message, attempting to resolve the links in the list the order until a first link that can be resolved is identified. The application identified by the first link is accessed.

In some implementations, the application corresponding to a particular link in the ordered list is an application that is provided by the particular vendor. Accessing that application includes attempting to execute the application on the user device. The application content can include an identifier for the inventory item, and the particular link can include a location of the identifier for the inventory item within the application. In this way, if the application is successfully executed on the user device, the user can access the inventory item of likely interest to the user readily from the particular vendor via the application provided by the vendor.

In some implementations, the application corresponding to a particular link in the ordered list is an application that is provided by the particular vendor. Accessing the application includes: (i) accessing a computer system via a network, (ii) downloading the application from the computer system, and (iii) installing the application on the user device. The computer system accessed via the network (e.g., the Internet) can corresponds to an app store or to the particular vendor, from where the app can be downloaded.

In another aspect a computer implemented method includes receiving at a user device user selection of a resource and, in response, attempting to open a link associated with the resource. The link identifies both a first application and a location of an inventory item in content of the first application. The method also includes determining that the first application is not installed on the user device and, as such, opening a second application that is configured to install the first application on the user device. The method further includes configuring the user device so that when the first application is executed on the user device, the first application will open the location of the inventory item in a user interface of the first application.

The resource can be one or more of a uniform resource locator, a markup language document, a selectable control, or an image. The inventory item can be a product, a service, an organization, an establishment, or content. The second application can be configured to transmit to an app store server, an identification of the first application and an indicator of the location of the inventory item in the content of the first application.

In another aspect, a computer implemented method includes receiving at a user device a resource that is associated with both an inventory item and a first application. In addition, the method includes determining, in response to selection of the resource, that the first application is not installed on the user device, and transmitting an identifier of the user device, an identifier of the first application, and an identifier of the inventory item, to a server. The method also includes receiving and installing the first application on the user device, and receiving from the server a location of the inventory item in content of the first application. As such, when the first application is executed on the user device, the first application will open the location of the inventory item in a user interface of the first application.

In another aspect, a computer implemented method includes receiving at a server an identifier of a user device, an identifier of an application, and an identifier of an inventory item. This information can be transmitted to the server in response to a user selecting a resource received at the user device. The identifier of the application and the identifier of the inventory item are associated with the identifier of the user device. The method additionally includes determining, in response to a request from the application installed on a user device, that the requesting user device corresponds to the received identification of the user device. A location of the inventory item in content of the application can be transmitted to the user device, so that when the application is executed on the user device, the application will open the location of the inventory item in a user interface.

In some situations, the resource received at the user device can include a deeplink, i.e., the received resource can include a location of a particular inventory item in the contents of a corresponding app. The server that stores the association, as described above, itself, or another server can predetermine the location of the inventory item, e.g., using the information about the inventory item and the app to be opened on the user device. The server that stores the association can also be programmed to determine the location of the inventory item based on the identifier of the application and the identifier of the inventory item. The identifier of the user device can include a device identifier, a device fingerprint, or a combination thereof.

In another aspect, a computer implemented method includes receiving an entity identifier, and identifying several links that each identifies a respective location of the entity in content of a respective software application. The methods also includes calculating a respective score for each of the several links based on, at least, a probability that a user would engage with the respective application. The links are ordered according to the respective scores, and the method includes providing a resource to a user device wherein the resource is associated with each of the ordered links. The entity identifier can identify a person, place, or thing.

In some implementations, the method includes receiving an inventory of software applications installed on a user device, and at least one of the several links is selected such that the software application corresponding to that link is included in the received inventory. Each software application can be associated with at least one action, and calculating a respective score for each of the several links can be further based on, at least, a probability that the user would perform at least one of the actions associated with the respective applications of the links. One or more actions associated with a software application can include a purchase, a view, a social engagement, or a brand engagement. The resource can include a uniform resource locator, a markup language document, a selectable control, or an image.

In another aspect, a computer-implemented method includes displaying on a user device a resource that is associated with an entity. The resource also corresponds to several links ordered according to a respective link score. Each link identifies the entity in content of a respective software application corresponding to that link. The method also includes receiving user selection of the resource and, based thereon, attempting to resolve, in order, the respective application identified by each link of the ordered links until a link that can be resolved is identified. The method can include opening a location of the entity in a user interface of the application corresponding to the resolved link. Attempting to resolve the respective application identified by a link can include attempting to open the application identified by the link on the user device, and determining if the attempt to open the application succeeded or failed. Additionally or in the alternative, attempting to resolve the respective application identified by each of the ordered links until a link that can be resolved is identified can include determining that the application of the link is not installed on the user device and, based thereon, opening a web page that contains the entity.

Various implementations of each of these aspects include corresponding systems, apparatus, and/or computer programs.

BRIEF DESCRIPTION OF THE DRAWINGS

The implementations depicted therein are provided by way of example, not by way of limitation, wherein like reference numerals generally refer to the same or similar elements. The drawings are not necessarily to scale, emphasis instead being placed upon illustrating aspects of the invention.

DETAILED DESCRIPTION

Priority Links

In various implementations described herein, a marketer or provider of the product or service can associate links with the product or service in a manner that can increase the likelihood that a consumer will buy the product or service. This is achieved, in part, by presenting to a consumer a choice of different locations and/or tools to access the same product or service, via a so-called prioritized link. A list of prioritized links can direct a user to a deeplink in an application, to an app store, or to a web site, in a particular order pre-specified by a marketer. Generally speaking, a deeplink is a link to an app or a website that direct the user to a specific location within a user interface of the app where the user can directly access the inventory item associated with the link.

Figure 1:
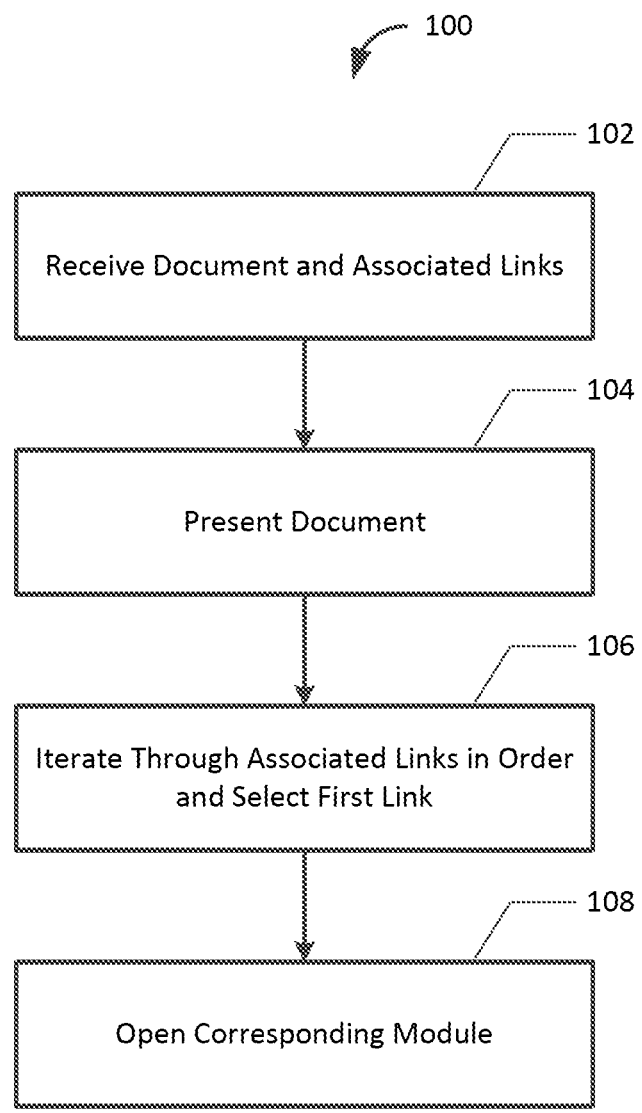
FIG. 1 depicts an example of a process of selecting a module according to a specified order so as to provide access to an inventory item, according to one implementation.

Specifically, with reference to FIG. 1, a user device can electronically receive a marketing message in step 102. A user device is a data processing apparatus such as, for example, a smartphone, smart glasses, a smart watch, or a tablet computer. Other types of user devices are also possible. The marketing message can be any communication that is received electronically, e.g., an advertisement, a marketing message such as an email, a webpage, a presentation, a text message, push notification, etc. The marketing message can be associated with a particular inventory item. Generally speaking, an inventory item can be any product or service about which a marketer can provide information to the user via the marketing message. Examples of products include a book, a movie/concert ticket, a piece of furniture, etc. Examples of services include hotel reservations, requesting taxi service, ordering pizza, etc. In some implementations, another different system can infer that the user is likely to be interested in a particular product and/or service, prepare a marketing message corresponding to that product/service, and deliver the marketing message to the user device.

The marketing message received in step 102 is also associated with or includes one or more links. Each link corresponds to a module that can provide access to the particular inventory item associated with the marketing message. A module can be any software component executable and/or displayable on the user device. Some modules can be different apps (i.e., software systems/programs) installed on the user device. A module can also be a marketplace where a user can download an app that can provide access to the inventory item. Other examples of a module include a webpage or a mobile webpage of an online store at which the particular product or service can be purchased, downloaded, etc.

A link associated with a module can be a deeplink, i.e., the link can not only identify the corresponding module but also can direct the user specifically to the inventory item associated with the marketing message within the contents of the module. For example, if the inventory item is a song identified by the title thereof, a link to a music app installed on the user's device can be a deeplink to that particular song so that upon opening the app, information for purchasing and/or downloading that song is automatically and readily provided by the app to the user. In another example, the inventory item is a concert ticket, the module corresponding to one of the links is a website of the concert venue, and the link can directly point a user to a specific webpage that can allow the user to purchase tickets for that particular concert.

The links associated with the marketing message received in the step 102 are ordered as specified by a marketer. For example, for one product the order can specify that a link to an app is of the highest preference followed by a link to an online app store where a user can download an app to buy the product. The link of the least preference can direct the user to an online store where the user can buy the product. For a different product or service, the specified order can be different. For example, the most preferred link can still be to an app, but the next preferred link can be to a website, followed by another link to a different website as the next preference. The link of the least preference can direct the user to an app store.

In step 104, the received marketing message is presented to the user, e.g., on a display of the user device. In step 106, the user's response, indicating that the user is interested in the inventory item corresponding to the marketing message, is received. As system receiving a user response to the marketing message causes the user device to iterate through one or more links associated with the marketing message, in the specified order. For each link, if the module associated with the link is an app, it is determined in step 106 whether that app is installed on the user device. If the app has not been installed, the next link in the ordered list is explored. If the next link corresponds to a different app, it is determined in step 106 whether the other app is installed on the user device. If not, the next link is explored in step 106.

In this iterative process, a particular link can be associated with an app store. The link can be a deeplink, i.e., it is associated with a particular app that can provide access to the inventory item, and that is available at the app store. A particular link can also be associated with a webpage of an online store. The webpage can be a mobile webpage, and the link can be deeplink, i.e., the link can direct the user to the particular inventory item on the mobile webpage.

The iterative process generally continues until a module associated with an explored link is resolved. If the module is an app, the resolution generally means that the app is found to be installed on the user device. Additionally, resolution can also include determining whether the app can be opened. If the module is an app store, resolution can mean determining whether the user is able to access the app store and, optionally, whether the user was able to download a specific application. The resolution can further include determining whether the user opened the application. If the module is a webpage, the resolution can include determining whether the webpage is accessible from the user device.

Once the first module that can be resolved is identified in step 106, that module is opened in step 108, enabling the user to readily access the inventory item corresponding to the received marketing message. In the case of a product such as an e-book, a song, a ticket, etc., the user can purchase and download the purchased item and if the inventory item is a service, the user can request the service such as requesting a cab, making a reservation at a restaurant, etc.

Figure 2A:
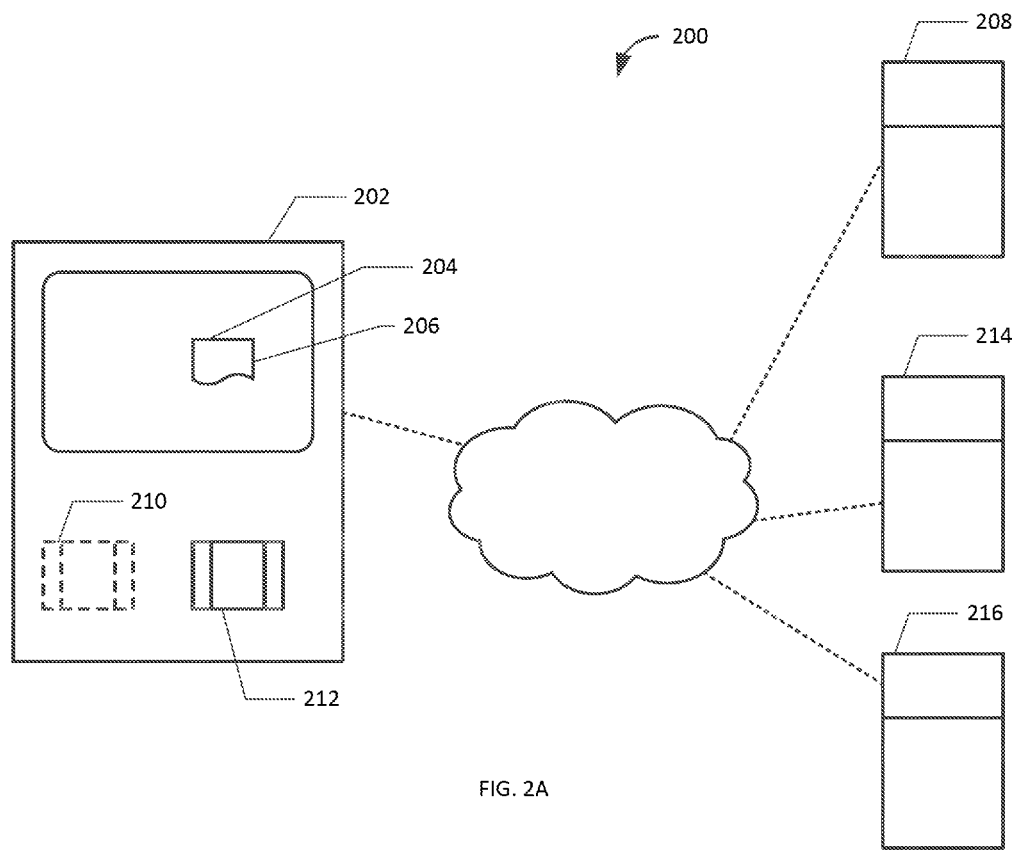
FIGS. 2A and 2B schematically depicts an example of a system in which a user device can access an inventory item, according to one implementation.
Figure 2B:
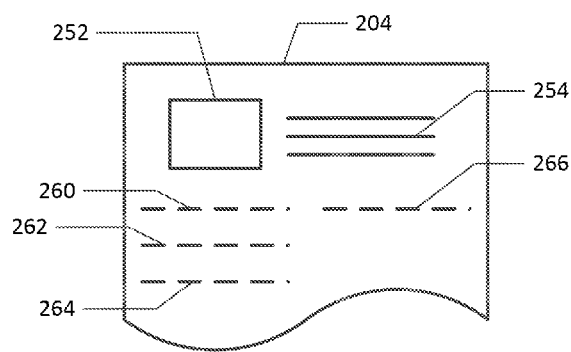

With reference to FIG. 2A, in the system 200, a user device 202 receives a marketing message 204 that is displayed on a display 206 of the user device 202 using a software program or an app. With reference to FIG. 2B, the marketing message 204 includes an image 252 and text 254 corresponding to an inventory item (i.e., a product or service). It should be understood that marketing messages, in general, can include only an image, only text, and neither, but other forms of messages such as presentations, videos, etc. A marketing message displayed on a user device can also include other forms of presentation and media in addition to an image and/or text, and can include more than one images and/or more than one text items.

The marketing message 204 also includes four links 260-266 that are collectively called priority links. While this example shows four links, a marketing message in general can include fewer or more (e.g., 2, 3, 6, 10, 15, etc.) links. The links 260-266 are not displayed on the display 206. Each link corresponds to a different module, and the list of links 260-266 is ordered in an order specified, e.g., by a marketer. In one implementation, the marketing message 204 including the priority links can be generated at a system 208 (e.g., a server) and can be transmitted to the user device 202, generally but not necessarily wirelessly, via a network. A vendor or marketer can explicitly specify the order of priority links for a particular inventory item, e.g., by communicating with the server 208. Alternatively, or if the vendor/marketer does not explicitly provide an order for a particular inventory item, the server can access the vendor's or marketer's website (a computer system in general) and obtain the vendor's default order for the priority links for various inventory items of that vendor. Alternatively, or if neither an explicit nor a default order can be obtained from the vendor, the server 208 can order the priority links according to the server's default order. In some implementations, the vendor/marketer can send a marketing message to a user device, and a software application on the user device, in response to the user taking an action with respect to the marketing message (e.g., clicking, tapping, etc.), can contact the server 208, transmitting thereto information about an inventory item associated with the marketing message. The server 208 can then generate priority links for that vendor/marketer, for the particular inventory item, and transmit them to the user device, e.g., for further processing by an application installed on the user device.

In some implementations, the server 208 can receive a list of apps installed on the device of a particular user and can customize the ordered list of links for that user. Specifically, one or more links in the marketing message can be associated with one or more apps that are known to be installed on the user device, and those links can be designated a higher priority than links to other apps not known to be installed on the user device or links to other modules such as app store webpage, online store web page, etc.

The link 260 corresponds to an app 210, which is not installed on the user device 202. The link 262 corresponds to an app 212 which is installed on the user device. The link 264 corresponds to an online app store 214 that can be accessed from the user device 202 using a network. The user can download and use an app from the app store (e.g., the app 210 or another app) and can access the inventory item using the downloaded app. To this end, the link 264 can be a deeplink, providing direct access to the app to be downloaded from the app store 214. Finally, the link 266 corresponds to a mobile website 216. The link 266 can also be a deeplink using which the user can directly access the inventory item available at the website 216.

In one implementation, the user clicks on the image 252 and, the user device 202 is programmed to iterate, in response to the user clicking (or another action), through the links 260-266. An app used to display the marketing message 204 or another software program can perform this iterations. During the iterations, it is determined that the app 210 is not installed on the user device 202, and that the app 212 is found to be installed. Therefore, the app 212 is opened and a user interface (UI) thereof is displayed in the display 206. The iterations can terminate because the app 212 was opened successfully. The link 262 corresponding to the app 212 is a deeplink and, as such, the UI readily displays information about the inventory item in the display 206. The user can then buy and/or download the inventory item of interest. In some instances, if the app 212 did not open successfully, the software program performing the iteration can continue resolving the remaining links 264, 266 in order.

Intent Queries

Figure 3:
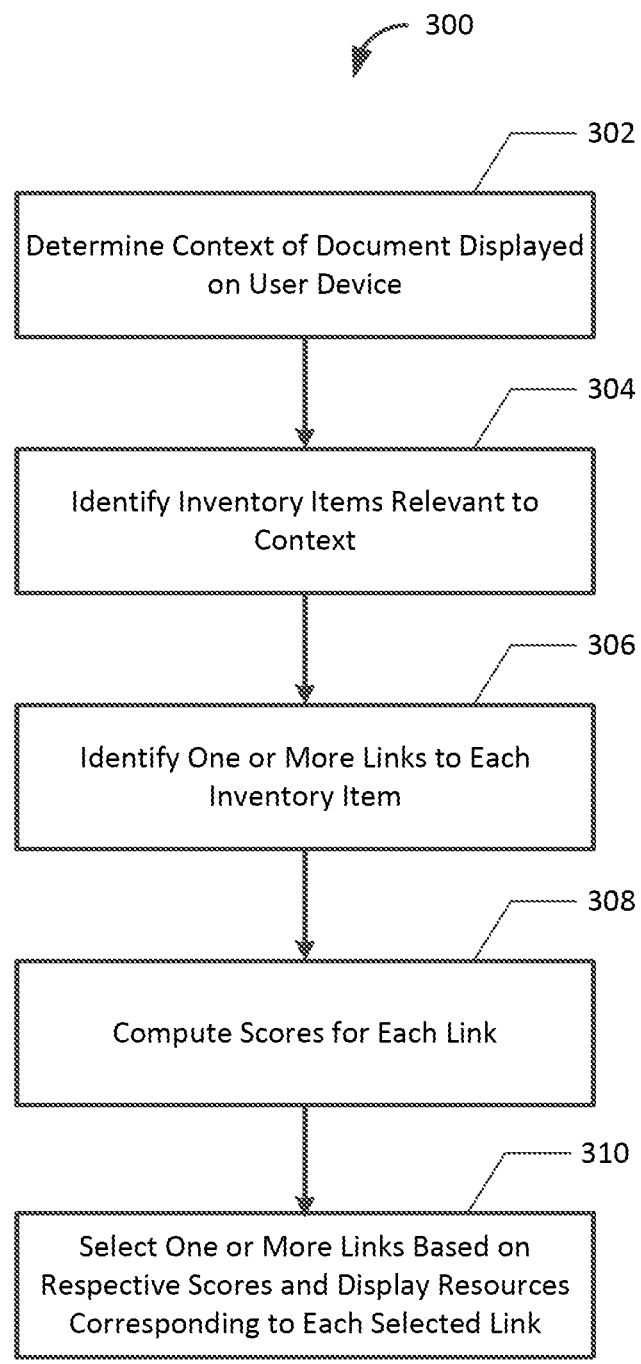
FIG. 3 depicts an example of a process of providing links corresponding to one or more items of interest, according to one implementation.

In the process 300 depicted in FIG. 3, a context of a document presented on a user device is determined in step 302. A document, in general, is a collection of one or more items such as text, images, audio and video content, etc., presented to the user. Examples of documents include an app's graphical user interface, a web page, a file that is downloaded and displayed, a presentation, images, audio content, video content, etc. The context generally provides information about the environment in which the document is presented and/or information about the content of the document itself. A context, for example, can be news, if the document is an online newspaper article. The context can be more specific, such as whether the newspaper article is included in the arts and entertainment section, travel and leisure section, or sports section. The context can also be a particular department of an online store, such as, for example, the books section or the movies section of an online bookstore. The context can also include information such as time of the day, user's location, past purchase details, etc. The context can be determined via textual analysis of the document. The textual analysis, that can be called Named Entity Recognition, can include search for keywords, trademarks, etc. Other types of context are possible.

In step 304 a number of inventory items relevant to the context are identified. Generally speaking, an inventory item can be a product, a service, an event, an organization, an establishment, or digital content (e.g., music, videos, electronic books). An inventory item can be identified by selecting one of the items specified in the document presented on the user device. For example, the document can provide information about tickets to the concert of an artist and, the corresponding inventory item can be the concert tickets. Generally, however, one or more identified inventory items are not specified in the document, but can be derived from the context of the document in the step 304. In one example, the context is a review of a movie. A first inventory item is the movie tickets, and a second, related inventory item that is derived, can be taxi service, so that the user purchasing the movie tickets can go to the movies. Additionally, or in the alternative another, related inventory item that is derived is restaurant review pages for restaurants nearby the movie theatre.

For each of the inventory items identified in step 304, one or more links, collectively called intent links, are identified in step 306. A link, when selected by the user, can open an app installed on the user's device through which the user can place an order or request the inventory item. In some instances, the app that can be used to order/request or otherwise interact with the inventory item (e.g., seeking additional information, viewing related information, etc.) can itself be the app displaying the document, so that the app need not be opened. A deeplink within the app however, can direct a user to the inventory item. For example, if the user is using an app of an electronics store, a deeplink to a new phone can be displayed within or by the app.

A link, when selected, can also open a web page or a mobile web page where the user can place an order or request for the inventory item. In one example, the user creates a picture story or a collection using a pictured editing app such as Flipagram™, Pic Stitch™, Aviary™, Pic Collage™, InstaSize™, InstaFrame™, etc. In this example, the document is the picture story/collection, the context is picture editing and the corresponding inventory item is picture printing service. This service is provided by a number of vendors—Shutterfly™, Walgreens™, CVS Photo™, Snapfish™, and PostalPix™, to name a few. In general, some vendors of a particular service provide both apps for use on mobile devices and websites, while others only provide a website. In step 306, links to some of these vendors are identified. For example, Link_1 can direct the user to an app provided by Vendor_A and Link_2 can direct the user to Vendor_A's website. Link_3 can direct the user to Vendor_B's app.

In another example, the user uses a music recognition service (e.g., Shazam™) to get information about a song the user is listening to. In yet another example, a user could be reading an article about a musician in Rolling Stone™ or Billboard™ website, or in apps thereof. In these examples, the song, the context is music and the inventory item is the particular song identified by the music recognition service. The various links identified in the step 306 can refer to different online music stores and/or services (e.g., iTunes™, Google PIay™, Pandora™, Milk Music™, Spotify™, and Radio™). As in the previous examples, some of the links can be links to an app installable on a user device and the other links can be links to a website of a particular music store.

In general, the intent links can include links to apps and/or websites of different vendors. The links to apps can be deeplinks, allowing the user to access the inventory item corresponding to the link directly within a UI of the app. One or more of these can be priority links as well, as described above, i.e., a link can be a set of links including a link to a particular vendors app, a link to that particular vendor's website, and a link to an app store from where that vendor's app can be downloaded on the user device. Several orders other than that noted above are feasible within any priority link included within intent links. Moreover, the intent links can be ordered such that links of different vendors are intertwined. In one example, the intent links are ordered such that links to the apps of different vendors are explored first. One or more of these can be deeplinks. Should all of those apps fail to provide access to the inventory item corresponding to the link, the websites of those vendors are explored. The order of vendors for exploring the apps and for exploring the websites can be the same or it can be different. Priority links of one or more vendors can be intertwined with the links of other vendors.

In some implementations, the links can include one or more links to other related but different inventory items. In the music context example above, it can be determined in step 304 that the user is likely interested in purchasing a particular song and/or attending a live concert by the band performing that particular song. As such, a first inventory item is the song, as described above, and the second inventory item is concert tickets to a concert by the performer of that song. Therefore, the links identified in the step 306 can include links to ticket brokers (e.g., TicketMaster™, LiveNation™, StubHub™, SeatGeek™, etc.) and/or links to concert venues such as theaters, performance halls, arenas, etc.

Some of these links to related inventory items can be deeplinks. Generally speaking, a deeplink is a link to an app or a website that direct the user to a specific location within a user interface of the app where the user can directly access the inventory item associated with the link. Thus, a deeplink to a ticket broker app in the example above can not only invoke the app but also can open a particular user interface of the app that can be used to buy tickets for a concert performance of a particular band. Similarly, in the case of song as an inventory item, a link to the mobile website of an online music store can direct the user to the particular song within the app that the user can purchase and/or download.

In step 308, scores for each link identified in the step 306 are computed. These scores generally represent a likelihood that the user will engage with the corresponding link so as to order the associated inventory item. To illustrate, in the music context example above, a server can determine that the user is more likely to purchase the first inventory item, i.e., the song, than purchasing concert tickets. In addition, a server can also determine that the user is more likely to buy, stream, and/or download the particular song from Pandora™ than from Radio™. The scores for each link can be computed using one or more of the manners described below.

As one example, a similarity between the context and one or more attributes of the inventory item associated with a link is determined. An attribute of an inventory item can be a brand, a model, a type of product or service, a type of establishment, a technical specification of a product or service, location, and/or a description of the inventory item. Thereafter, relevance of the inventory item and/or corresponding link is determined based on the similarity. In one implementation, given the context (e.g., a search query) the system iterates through all available inventory items and determines textual relevancy of each item to the context. For example, a number of words common to the query (context, in general) and the inventory item are identified, and the common words are weighted. Generic words are not weighted as heavily as specific or unique words. For example, in a phrase "the Los Angeles Lakers™," the word "Lakers™" is given a greater weight relative to each of the words "the" and "Los Angeles." After computing the similarity scores, the top N inventory items are selected as candidates for identifying links associated therewith. The number of inventory items N can be 1, 2, 3, 5, 10, etc. In computing the N scores, textual relevancy can be used in combination with geographic proximity. The score of a particular link can be determined according to the relevance of the inventory item associated with the link to the context, determined as described above.

In some implementations, a geographic location of the user device is determined and a probability that the user of the user device would engage with an app corresponding to a particular link is computed based on the geographic location of the user device. To illustrate, in one example, a user views a movie preview and based thereon, movie tickets for that particular movie is identified as the first inventory item. A taxi or car service (e.g., Uber™, Lyft™, SideCar™, FlyWheel™, etc.) can be identified as a second inventory item. Based on the location of the user's device, if a movie theater that can sell the tickets via an app installed on the user's device or via a website is determined to be within a couple of blocks, the links associated with the different taxi/car services can be scored low. On the other hand, if the user is a few miles away from that movie theater, the links to the taxi/car services can be scored high. In general, in various implementations, based on a query/context related to a location inventory items relevant to that location are identified. In some implementations, the type of the user device can also be considered in computing the score. For example, if the user is determined to be using a smartphone, high scores can be assigned to the links to the taxi/car services. If the user is determined to be using a tablet, however, high scores can be assigned to links to shopping and reading services.

In some implementations, demographic information of a segment of a population is obtained. The demographic information can be received from and/or derived from third-party data, or can be inferred from a user's device type. For example, some studies suggest that iPhone™ users are likely to be wealthier than Android™-based phone users. A user's geographic location can also inform demographic inferences. For example, studies can indicate that the users in a particular zip code are likely wealthier, or more likely to purchase certain products and/or services than users in in a different zip code. The probability that the user of a particular device would engage with an application or website associated with a link can therefore be based on a likelihood that an individual in the segment of the population would engage with that particular application or website.

For example, if a selected inventory item is hotel reservation, the system can assign a high score to a link associated with the app provided by Vendor_X (e.g., AirBnB™, HotelTonight™, etc.), if the user is a person belonging to one particular age group, and can assign a high score to a link associated with a mobile website of a Vendor_Y (e.g., Hotels.com™, Expedia™, Priceline™, etc.), if the user is a person belonging to a different age group. Similarly, if the inventory item is groceries and if the user resides in a certain region, links to apps by non-traditional grocery stores (e.g., Target Cartwheel™, AmazonFresh™, etc.) can be assigned a high score. If the user resides is a different region, links to apps by traditional grocery stores (e.g., Safeway™, Ralphs™, Stop n' Shop™, etc.) can be assigned a high score. The demographic information is obtained based on one or more of: a device identifier of the user device, a geographic location of the user device, or a type of user device.

Information about a user can be aggregated using a device id, device fingerprint, or web cookies. The types of information aggregated can include demographics, click and purchase behavior, device type, etc. Machine learning models can be used to identify a user based on, e.g., a device fingerprint. For example, one particular user uses the same browser via three different IP providers (e.g., at work, at home, and via a mobile network) every day, the fingerprint of that device can be identified as a distinct user and results can be personalized for that user, without using information explicitly identifying that user. Thus, user identification can be performed in combination with, or without using, device identifiers.

In some implementations, the score assigned to a link is computed by identifying a user of a particular device, and determining a similarity of the inventory item associated with the link to items the user has viewed, added to an electronic shopping cart, or purchased. Any of these actions can be performed in an application associated with the link or in a different application. Based on the action, a probability that the user of the user device would engage with the application associated with the link is computed based on, at least in part, the determined similarity, and the score is computed based on the computed probability. For example, if a user purchased a song from a particular artist, the probability that the user will buy another, different song from the same artist can be P_A. Moreover, if the user used Vendor_J's app to purchase the song, generally there is a high likelihood that if the user is to purchase the other song, the user will use the Vendor_J's app for the other purchase and a low probability that the user will use a different vendor's app for the other purchase. Furthermore, the probability that the user will buy a concert ticket for a concert of that particular artist can be P_B, and the probability that the user will buy the song in the same genre as that of the purchased song can be P_C. In the foregoing example, these probabilities can be factors in assigning scores to the links associated with the different inventory items, i.e., another song of the same artist, concert tickets, and another song in the same genre but by a different artist.

In some implementations, calculating the score corresponding to a link includes identifying a user of the user device and determining a conversion rate for engagements of items similar to the inventory item by the user for the app associated with the link. Generally speaking, an engagement is an act of viewing or an act of purchasing an inventory item by a user. A probability that the user of the user device would engage with that app is computed based on the conversion rate. For example, if the inventory item is car rental service, the frequency of the user renting cars from a rental company R1 can be F_1; from a rental company R2 can be F_2; and from a rental company R3 can be F_3. In addition, the probability of the user using a taxi service (which is another, related inventory item) from a taxi company T1 can be P_T1 and from a car service company T2 can be P_T2. These frequencies and/or probabilities of usage can change from place to place and, thus, can depend on the location of the use device. The scores associated with the links to apps or websites of the vendors R1, R2, R3, T1, and T2 can be based on the respective frequencies and/or probability of usage. These frequencies and/or probabilities generally represent a conversion rate for the corresponding app, which can be used in computing the respective link scores and in ranking the links.

In some implementations, an aggregate conversion rate for the app associated with the link is determined. The aggregate rate can be used if user-specific information is not available or if the system chooses not to use such information. The aggregate rate can include an overall conversion rate associated with that particular app in general, or can be based on only the apps associated with the demographic group of the particular user.

In some implementations, the marketers of different inventory items can submit bids, i.e., agree to pay a compensation for any traffic diverted to that marketer's apps and websites. If one or more of these inventory items are selected for presentation on the user device, the scores assigned to the links associated with these inventory items can be based on, at least in part, the respective bids. As such, calculating a score assigned to a link can include identifying a bid amount for the inventory item corresponding to that link, and calculating the score based on, in part, the bid amount. Generally, the greater the bid amount the greater the score. The bids can be used as a factor in determining link scores based on, e.g., textual similarity location/geography, demographics, and/or combinations thereof.

After the scores are computed for each link, one or more links are selected based on the computed scores in step 310. A resource corresponding to each link is generated as well, in the step 310. In general, a resource is any displayable interactive object. Examples of resources include a uniform resource locator, a markup language document, a selectable control, or an image such as a display button. Any particular resource can be associated with more than one links corresponding to a particular inventory item. For example, if the inventory item is a book, the resource can be a button "buy <book title>." The links corresponding to the button can include apps by different vendors and/or websites of different vendors. One or more of these can be deeplinks, directing the user specifically to the book associated with the button. Each of these links can be explored in order so as to maximize the likelihood that the user can buy the book of interest via at least one app or from a website.

These links can also be prioritized links. For example, a prioritized link for a vendor (e.g., Vendor_1) can first attempt to access a specific location corresponding to the book (inventory item in general) in an app of Vendor_1. If that attempt fails, e.g., because Vendor_1's app is not installed on the user device, the prioritized link can than attempt to direct the user to an online store from where the app can be installed. If that attempt fails as well, the prioritized link can direct the user to Vendor_1's website. The order of these attempts as described above is illustrative only; various other orders can be implemented, e.g., according to the vendor's specification. If the prioritized link for Vendor_1 fails, i.e., all links corresponding to Vendor_1 fail, another prioritized link for Vendor_2 can be explored.

Multi-Vendor Entity Links

Figure 4A:
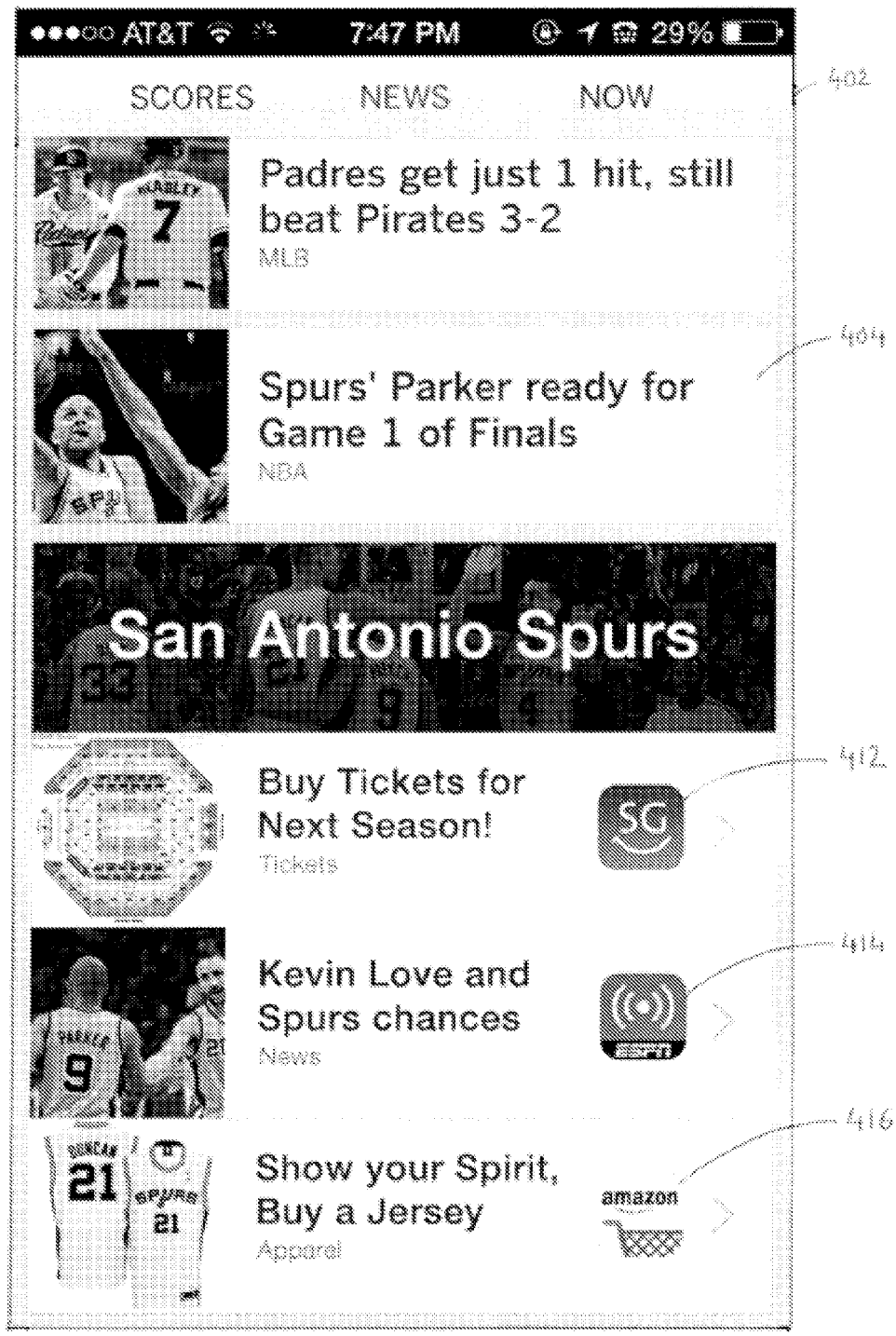
FIG. 4A illustrates three priority links for three vendors, according to one implementation.
Figure 4B:
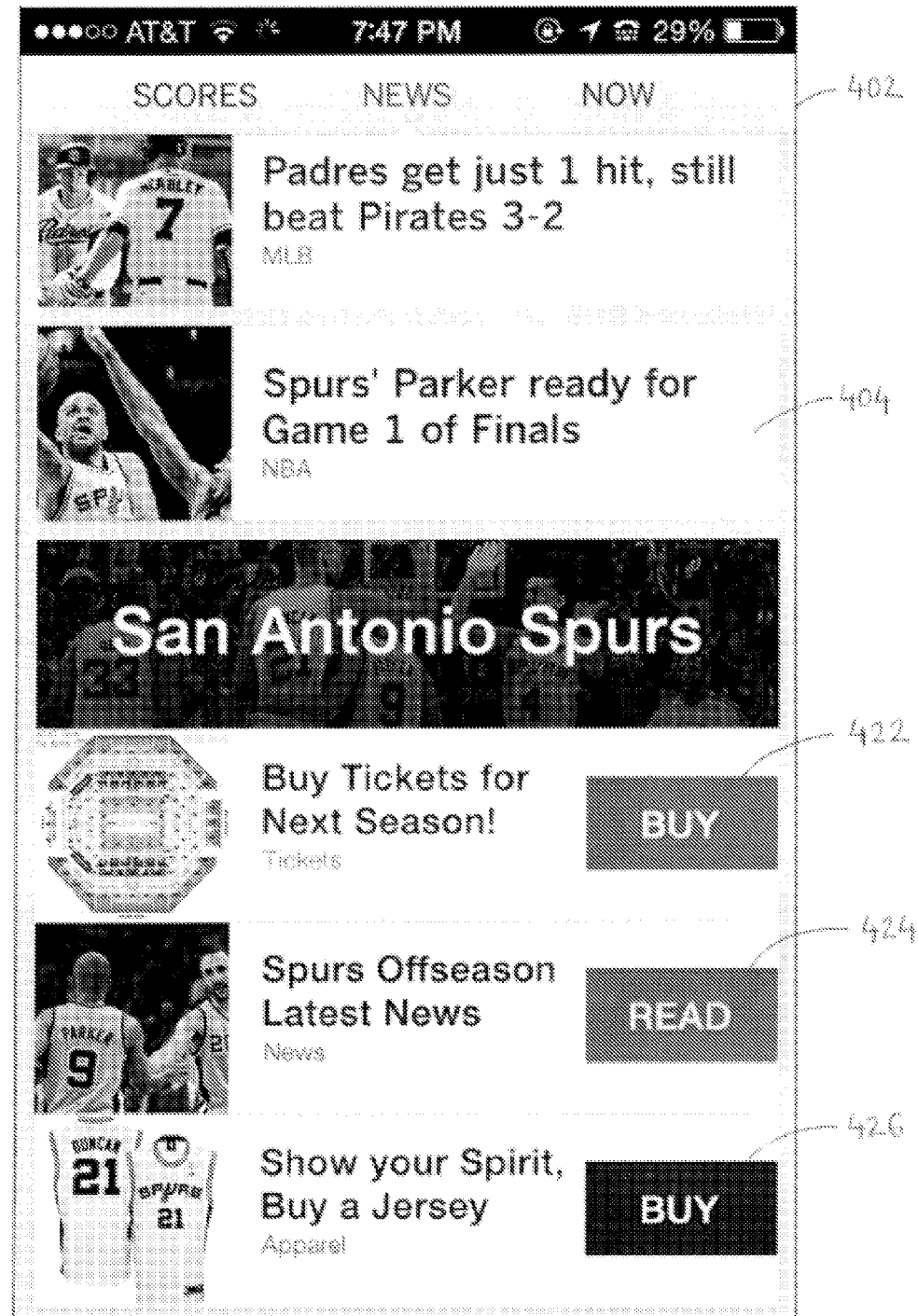
FIG. 4B illustrates multi-vendor entity links, according to one implementation.

With reference to FIGS. 4A and 4B, a document 404 is displayed on a user device 402. In this example, the context of the document 404 is determined to be a basketball game involving the team San Antonio Spurs™. Based on this context, a server determined that the user of the device 402 is likely interested in buying tickets for one or more scheduled games, listen to commentary about the team/game, and/or buy a team-related item such as a jersey. Accordingly, three resources are displayed on the user device 402. In the example shown in FIG. 4A, each resource presents vendor-specific priority links. The three different resources in this example are associated with three different vendors. The first resource, a button 412, is associated with the vendor SeatGeek™ and can explore several links associated with SeatGeek™. In particular, if a user selects the button 412 (e.g., by tapping on it, clicking it, etc.), thereby indicating the user's interest in buying tickets for a scheduled game, a software system installed on the user device will attempt to locate and run a SeatGeek™ software app on the user device 402. Should that attempt fail, e.g., the app is not installed on the user device 402, the software will automatically explore other Seat-Geek™ links according to a priority order specified within the resource 412. For example, the software can attempt to load in a browser a mobile webpage of SeatGeek™ where the user can buy the tickets. Should that attempt fail as well, the user can be directed to an app store from where the SeatGeek™ app can be downloaded and installed and, should that attempt also fail, the user can be directed to another webpage of SeatGeek™ where the user can purchase tickets for a game.

The resource 414, another button, is associated with the vendor ESPN™ and with the inventory item commentary about the team/game. Should the user select the resource 414, the software system installed on the user device can, in order: (i) attempt to run an ESPN™ app using which the user can listen/view the commentary about the team/game, (ii) direct the user to an online app store from where the ESPN™ app can be downloaded and installed on the user device 402, and (iii) direct the user to a website of ESPN™ where the user can listen/view the commentary. Other orders and/or additional ESPN™ specific links can be explored in different implementations. The third resource 416 is associated with the inventory item a team-related product, and with the vendor Amazon.com™. The resource 414 can also explore one or more links associated with Amazon.com™, in a specified order, so that the user can view, read about, and/or purchase a team-related product from the vendor Amazon.com™.

Any of the priority links associated with any of the resources can be a deeplink. For example, if the resource 416 displays a jersey and if the Amazon.com™ app were opened successfully on the user device 402, information specific to the jersey can be readily displayed in a user interface of the Amazon.com™ app as it is executed on the user device 402. Similarly, the user can be directed on the ESPN™ website to a specific video clip discussing the team/game.

It should be understood that in general, there can be as few as one resource or more than three (e.g., 4, 5, 8, 12, etc.) resources, and that two or more resources can be associated with the same vendor. Also, the number of priority links associated with each vendor can be different. For example, in one implementation, only one link is associated with one vendor and five links are associated with another vendor. The resources are ordered according to the scores associated therewith, e.g., an aggregate of the scores associated with the respective priority links associated with a particular resource. In general, the priority links are ordered according to their designated scores, i.e., from the highest to the lowest score. As described above, the computed scores can indicate a likelihood that the user will engage with the corresponding inventory item (e.g., a product or service) via a particular access mechanism such as an app installed on the user device, a mobile webpage, another webpage, etc.

With reference to FIG. 4B also, the document 404 is displayed on the user device 402, and the context of the document 404 is determined to be the basketball game involving the team San Antonio Spurs™. In this example, based on this particular context, a server determined that the user of the device 402 is likely interested in the inventory items: tickets for one or more scheduled games, news articles about the game, and/or a team-related product such as a jersey. Accordingly, three resources are displayed on the user device 402. In the example shown in FIG. 4B, however, each of these resources presents entity links.

Specifically, a resource 422, a link labeled "BUY," is associated with the entity (i.e., an inventory item) tickets for a scheduled game. If the user selects the resource 422, apps and/or websites of one or more vendors can be explored so as to facilitate purchase of the tickets by the user. For example, the software system installed on the user device 402 can first explore a software app of the vendor SeatGeek™. Should that attempt fail, the software system can explore another app of a different vendor, e.g., TicketMaster™. Should that attempt fail as well, the software system can explore an app of yet another vendor. Alternatively, or thereafter, the software system can explore the mobile and/or other websites of different vendors, where the user can buy the tickets.

A resource 424, a link labeled "READ," is associated with an entity, i.e., an inventory item, news about the sports team. The resource 424 can be associated with links (including deeplinks) to apps and/or websites of different vendors such as CNN™, New York Times™, ESPN™, CBS Sports™, etc. Similarly, a resource 426, a link labeled "BUY," is associated with an entity, i.e., an inventory item, a product associated with the sports team. The resource 426 can be associated with links (including deeplinks) to apps and/or websites of different vendors such as Amazon.com™, EBay™, San Antonio Spurs™, etc.

One or more vendor-specific priority links can be included as part of entity links. For example, if it is determined that the SeatGeek™ app is not installed on the user device 402, the software system can explore a collection of priority links (as described above) that are associated with the vendor Ticket-Master™. In general, however, different types of links (e.g., links to apps and/or links to mobile and/or other websites, any of which can be a deeplink), of different vendors can be intermixed and explored in any order. In one implementation, entity links are ordered or explored in an order in which the next link to be explored is determined to have the maximal likelihood that the user will be able to access the sought inventory item (i.e., entity). In another implementation, apps of different vendors can be explored first followed by links to mobile websites of different vendors, followed by other websites. The specific order can be selected using the scores computed, as described above, for the various links.

Figure 5:
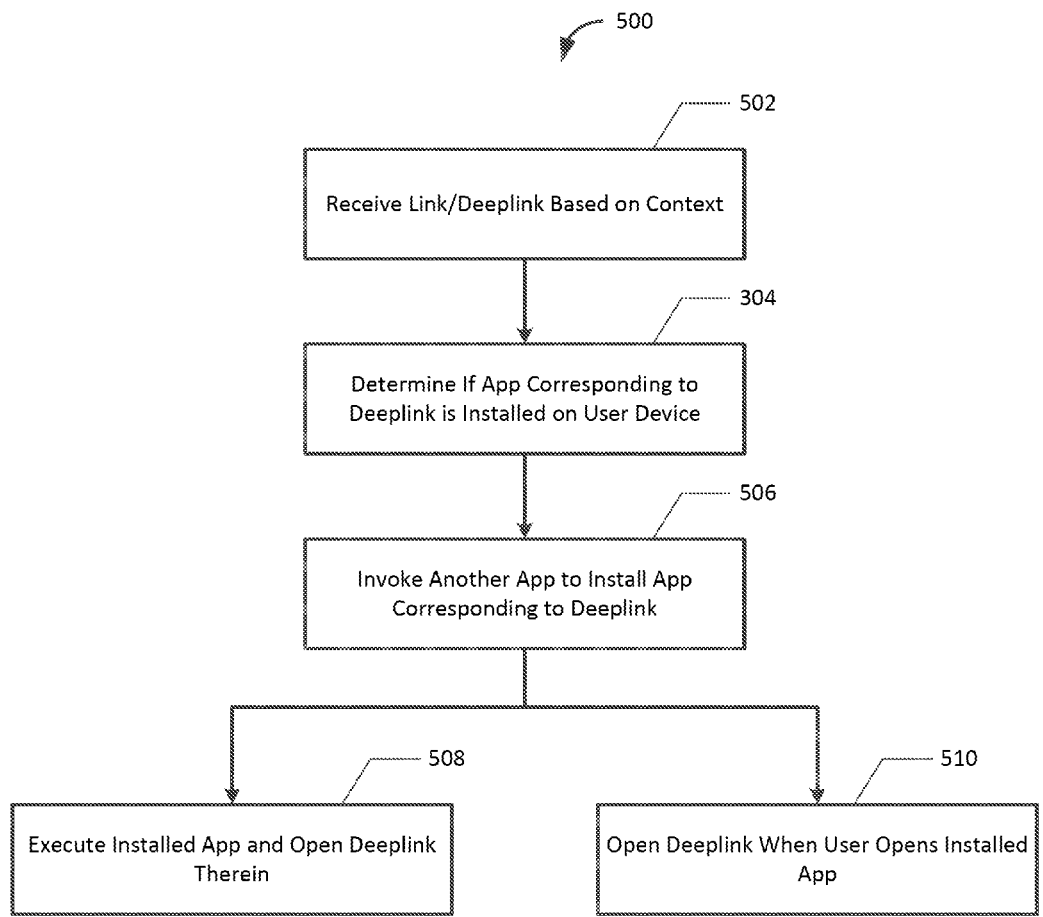
FIG. 5 depicts an example of a process of deferred execution of a deeplink, according to one implementation.

In some implementations, with reference to FIG. 5 depicting a process 500, a deeplink within a particular app to an inventory item determined to be relevant to a context is received in step 502. The deeplink can be generated, for example, as discussed above with reference to FIG. 3. In one example, a server determines that the user of a mobile device is likely to buy a pair of running shoes within a certain price range. In this context, a server generally means any computing device other than the user device, and a server can include one or more different computing systems. The server also determines that different vendors (e.g., Nike™, New Balance™, Target™, Dick's Sporting Goods™, etc.) have such a pair readily available. The server further determines that one of these vendors (e.g., Vendor_X) has an app that includes not only a listing for the particular pair of shoes but also listings of other products in which the user is likely interested. Therefore, the server generates a deeplink to the particular pair of shoes in Vendor_X's app, and that deeplink is received in the step 502. In some implementations, the server can determine that Vendor_X's app is not installed on the user device, but can generate the deeplink nevertheless. In other implementations, the server is unaware of whether or not the Vendor_X's app is installed on the user device.

In one implementation, a user device is provided with a resource (e.g., a button, a link, a picture, etc.) that is associated with a particular vendor (e.g., Vendor_X). After the resource is displayed on the user device and the user selects the resource, a message is sent to a server. The message can include information about the Vendor_X and an inventory item associated with the resource. The server can then identify deeplinks, website links, and links to app stores for the specified inventory item and corresponding to Vendor_X. The identification of the links can be based on, e.g., type of the user device. For example, if the user device is an iOS™ device, the app store/install link can be for an iOS™ app of Vendor_X.

A software system that can be installed on a user device can receive one or more deeplinks and/or app store to one or more vendor apps or webpages in step 502. The software system determines in step 504 that an app corresponding to a particular deeplink to an inventory item (e.g., Vendor_X's app in the foregoing example) is not installed on the user device. As such, the software system can be configured to invoke, in step 506, another app and/or a webpage that prompts the user to install the vendor app corresponding to the deeplink. For example, the software system can facilitate downloading and installing the vendor app from an online app store and/or directly from the particular vendor's website.

Specifically, in one implementation, a link to an app store is provided to the user device using which the user can download/install an app provided by a particular vendor (e.g., Vendor_Y). Additional information corresponding to a deeplink to a particular product can be included in or with the link to the app store, e.g., for Android™ apps. As such, when Vendor_Y's app is run on the user device, the app can direct the user to the inventory item corresponding to the deeplink. In some instances, however, the additional information corresponding to a deeplink is not included in the app store link. (e.g., in or with an app store link to Vendor_Z's app). When Vendor_Z's app is installed and run on the user device, the app can communicate with the server. For some apps however, such as iOS™ apps, additional information cannot be included in or with the link to the app store. Therefore, prior to sending an app store link to Vendor_Z's app, the server can store thereon a mapping between the user device identifier and the deeplink and/or a mapping between the user device fingerprint and the deeplink. When Vendor_Z's app communicates with the server, recognizing that Vendor_Z's app is running on the user device for which a mapping was stored, the server can send the stored deeplink to an inventory item, using which the user can be directed to that inventory item in Vendor_Z's app.

If the user does install the vendor app, in step 508 the software system can execute the newly installed vendor app and open the deeplink therein, that was received at the user device. To illustrate, in the foregoing example, Vendor_X's app can be installed and then that app can be executed such that content associated with the deeplink to the particular pair of shoes is displayed readily to an interface of the Vendor_X app. In some implementations, the software system does not automatically execute the newly installed app. Instead, if the user opens, i.e., runs or executes the app, the user is taken directly to the content associated with the received deeplink in step 510. In both scenarios, displaying of the content associated with the deeplink is deferred until after the app corresponding to the deeplink is installed on the user device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
receiving a message associated with an ordered list of links, wherein each link is configured to access an application associated with a particular vendor, the application being configured to provide access to an inventory item associated with the message;
displaying the message on a user device;
in response to user selection of the message, attempting to resolve the links in the list the order until a first link that can be resolved is identified; and
accessing the application identified by the first link;
wherein attempting to resolve a respective application identified by the link comprises:
attempting to open the application associated with the link on the user device; and
determining if the attempt to open the application succeeded or failed.

2. The method of claim 1, wherein:
the application corresponding to a link is an application that is provided by the particular vendor; and
accessing the application comprises attempting to execute the application on the user device.

3. The method of claim 2, wherein the application content comprises an identifier for the inventory item.

4. The method of claim 3, wherein the link comprises a location of the identifier for the inventory item within the application.

5. The method of claim 1, wherein:
the application corresponding to a link is an application that is provided by the particular vendor; and
accessing the application comprises: (i) accessing a computer system via a network, (ii) downloading the application from the computer system, and (iii) installing the application on the user device.

6. The method of claim 5, wherein the computer system accessed via the network corresponds to an app store or the particular vendor.

7. The method of claim 1, wherein the inventory item is a product, a service, an organization, an establishment, or content.

8. The method of claim 1, wherein the message is presented by a first application that is the same as the application identified by the first link.

9. The method of claim 1, wherein the message is presented by a first application that is different than the application identified by the first link.

\* \* \* \* \*